Aug. 18, 1964    C. L. WILLARD, JR    3,144,886
MACHINE FOR MANUFACTURING TORSION SPRINGS
Filed Jan. 5, 1960    6 Sheets-Sheet 1

INVENTOR
Charles L. Willard, Jr.
BY

Aug. 18, 1964  C. L. WILLARD, JR  3,144,886
MACHINE FOR MANUFACTURING TORSION SPRINGS
Filed Jan. 5, 1960  6 Sheets-Sheet 2

INVENTOR
Charles L. Willard, Jr.
BY
Julian Caplan
attorney

Aug. 18, 1964   C. L. WILLARD, JR   3,144,886
MACHINE FOR MANUFACTURING TORSION SPRINGS
Filed Jan. 5, 1960   6 Sheets-Sheet 5

INVENTOR
Charles L. Willard, Jr.
BY
Julian Caplan
attorney

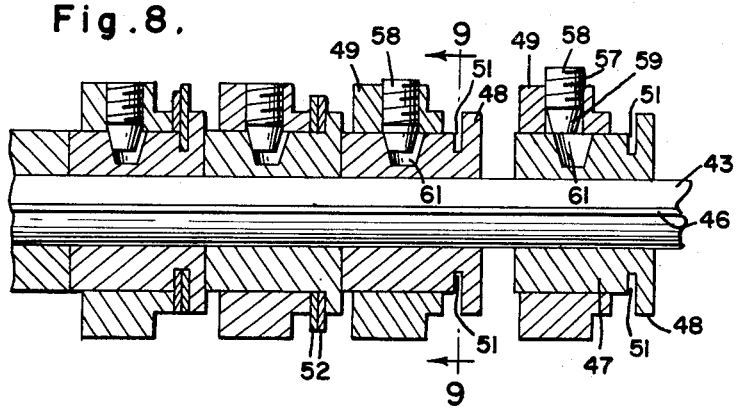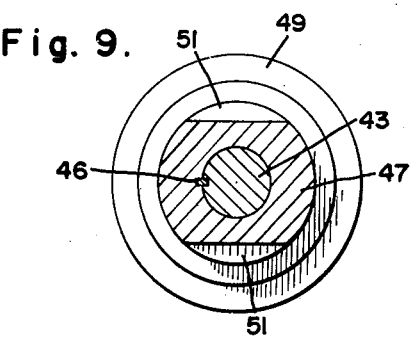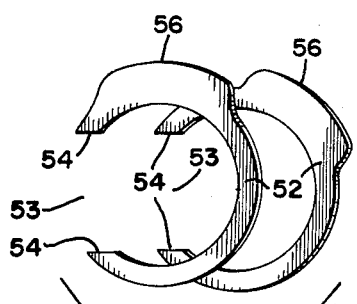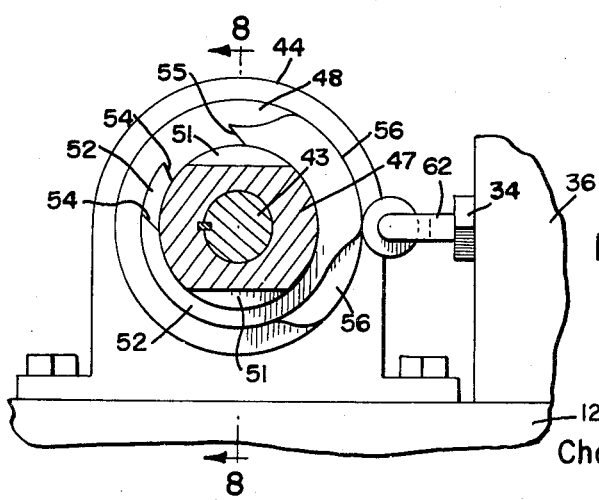

3,144,886
MACHINE FOR MANUFACTURING
TORSION SPRINGS
Charles L. Willard, Jr., 683 Ulloa St.,
San Francisco 27, Calif.
Filed Jan. 5, 1960, Ser. No. 589
9 Claims. (Cl. 140—71)

This invention relates to a new and useful machine for coiling and forming wire for the production of torsion type springs.

One of the features and advantages of the present invention is the provision of the machine to form a wide variety of simple or complex shapes of springs, wherein a multiplicity of different operations may be performed on the wire to produce a spring of the desired specifications. The machine may be changed over as required, depending upon the particular spring being produced, and an important advantage of the present invention is the facility with which the change-over may be accomplished.

Accordingly, the present invention comprises a machine for producing torsion type springs using hydraulically applied forces to feed, cut off, coil, bend and otherwise form the material. Heretofore machines for producing torsion type springs have used mechanically applied forces which are quite limited in their adaptability to the production of springs having complex shapes. Thus, complex springs have required the use of a series of machines, or a redesign of the spring to compensate for the limitations of the forming machine. All of these restrictions and disadvantages of mechanically controlled machines are eliminated in accordance with the present invention.

A further feature of the invention is the fact that the coiling spindle may be stopped and/or held at one or more positions during the coiling cycle. A further feature of the machine is the fact that the pitch or coil spacing of the completed spring may be rigidly controlled and infinitely varied and that a coordination of the coiling spindle rotation and the change in the vertical position of the spindle may be coordinated.

A further feature of the machine is the fact that forming pressures may be applied to the spring wire at any point or in any plane as required in order to produce a finished spring of complex or complicated shape all in a single operation.

A further feature of the invention is the fact that one or more sections or components of the machine may be removed, adjusted or repaired without affecting the adjustment or functioning of the other components required to perform the desired job. This results in great savings in set-up, repair and adjustment of the machine.

Another feature of the machine is the fact that although forward actuation of the moving parts is accomplished by hydraulic pressure, the return of the parts to initial position is accomplished preferably by means of springs. This arrangement practically eliminates tool breakage and injury to components due to material "hang-up," since all the various functions and/or components are returned to their initial or starting position by means of a spring pressure which may be adjusted and which is of considerably lesser force than hydraulically applied forces.

Another important feature and advantage of the invention is the fact that the timing of the various operations during the cycle may be readily adjusted, and the adjustment of one phase, component or function may be achieved without disturbing the adjustment of other such phases, components or functions.

Another advantage of the invention is the great flexibility in operation which may be accomplished by varying the hydraulic pressure, adjusting the return spring pressure, adjusting the timing and by flow control in the hydraulic line and tracer control valves.

Still another feature of the invention is the ease with which the completed springs may be handled in that an opening is provided in the bed plate immediately below the spindle, through which the completed parts may drop and under which may be positioned a tote box, truck or conveyor.

Other objects of the present invention will become apparent upon reading the following specification and referring to the accompanying drawings in which similar characters of reference represent corresponding parts in each of the several views.

In the drawings:

FIGS. 3A and 3B are side elevations of replacement tracer cams;

FIG. 7 is an enlarged sectional view of the timer taken substantially along line 7—7 of FIG. 2;

FIG. 8 is a sectional view taken substantially along line 8—8 of FIG. 7;

FIG. 9 is a sectional view taken substantially along line 9—9 of FIG. 8;

FIG. 10 is a perspective view of a pair of timer cams;

Figure 1:
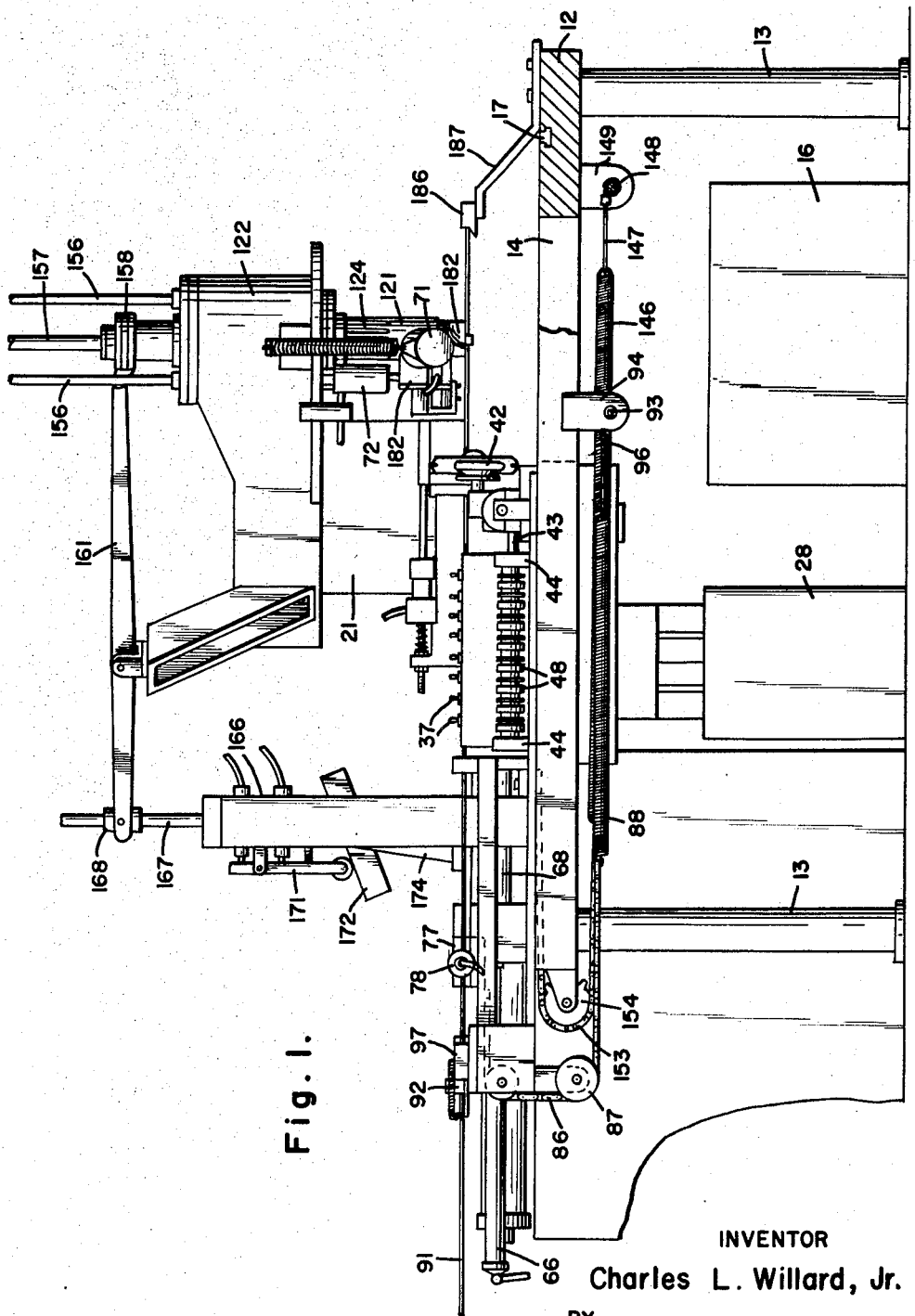
FIG. 1 is a side elevation of the machine.
Figure 2:
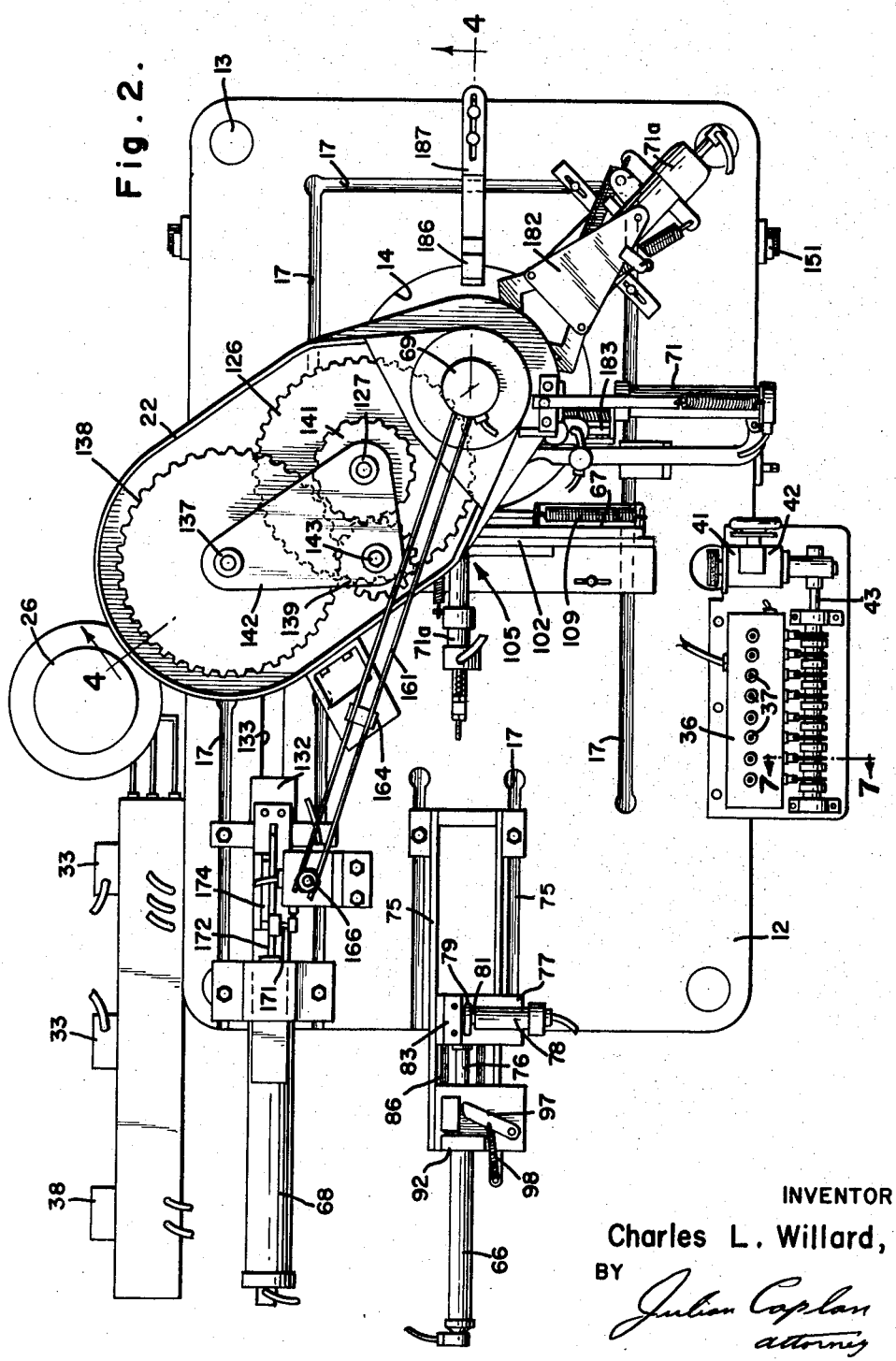
FIG. 2 is a top plan.

The main frame of the present machine comprises a table 12, which is an elongated, extremely rigid, horizontal plate supported above the floor by means of legs 13. Table 12 is cut away in a circular hole 14 through which the completed parts may drop into a tote box 16, or other receptacle or conveyor (not shown). Formed at various locations in the top surface of table 12 are T slots 17 similar to the slots in a milling machine table. The purpose of the slots 17 is to provide means to align and hold various mechanisms and tools in a multiplicity of locations, depending upon the particular requirements of the spring being produced. The under surface of table 12 is formed with ways 18, in which reciprocate longitudinally the main spindle actuating rack 19. Above the top surface of table 12 is a hollow, vertical spacing housing 21, located rearwardly of hole 14 and above spacer housing 21 is a gear housing 22 which projects forwardly to overhang hole 14.

The machine is preferably driven by hydraulic means, and for such purpose there is provided a motor 26 which drives a high pressure pump 27 which draws hydraulic fluid from a sump 28 and thence through a filter 29 and distributor 31 where the hydraulic fluid is distributed to various valves 32. Each valve 32 is preferably controlled by a solenoid 33, and each solenoid 33 is controlled by a microswitch 34 located at a timer box 36. Each switch 34 is in series with an off-on manual switch 37 which may be used to disconnect a particular valve 32 and its function. Associated with certain of the solenoid operated hydraulic valves 32 are flow control valves 38 which may be adjusted to regulate the rate of flow through the valve. Gages, oil level indicators and the like (not shown), as in conventional systems, are employed. Preferably an accumulator or pressure control 39 which smooths out the pulsation of the hydraulic pump 27 and supplies extra fluid to the system if the demand is beyond the capacity of the pump is installed, as is well understood in the hydraulic control art.

The various switches 34 are energized and deenergized by timer mechanism 36. Timer mechanism 36 is driven by an electric motor 41, the speed of which is adjusted by a Graham variable speed drive 42, arranged to drive timer shaft 43. Timer shaft 43 is a horizontally disposed shaft mounted in ball bearing pillow blocks 44, which is rotated by motor 41 at an infinitely variable speed. Locked on the shaft 43 by key 46 are stationary collars 47, having enlarged portions 48 and immediately to one side of each portion 48 and slidable on stationary collar 47 is slidable collar 49. Adjacent portion 48 collar 47 is formed with diametrically opposed chordal slots 51. Two cam members 52 are used in association with each said collar 47, and each pair of cams 52 is associated with one of the switches 34. Cam 52 consists of a relatively thin annular disc having its inside diameter equal to collar 47, which is cut away at one segment 53 so that the cam has a horseshoe shape. The distance between the points 54 of the horseshoe is such that the cam 52 may be slid onto the collar 47 through slots 51, but when turned through a small angle is locked on the collar 47. The external surface of each cam is cut in the desired shape to provide a high dwell 56, the remainder of the circumference comprising the low dwell and pairs of cams 52 are overlapped so that the composite length of the high dwells 56 of the cams may be adjusted by angular movement of the two cam members relative to each other. Once the adjustment has been made the cams 52 are locked against the enlarged portion 48 of stationary collar 47 by means of axially slidable locking collar 49. Locking collar 49 has a threaded hole 57 in which is a set screw 58, the point 59 of which is eccentric, and fits into countersunk hole 61 in collar 47. Thus by tightening set screw 58 slidable collar 49 is moved toward portion 48 and jams against the cams 52, thereby locking them in position. This arrangement of parts permits ready replacement of cam members 52 for cam members of other shapes so that the desired cam dwell may be changed. Further by reason of the facility of angular movement of the cam members 52 relative to each other the composite high dwell may be adjusted, and hence an infinite control of the timing of each switch 34 is achieved. Each switch 34 has a roller finger 62 which extends into the path of the high dwell of the composite cam and controls the energization of the solenoid 33 for the particular valve with which the switch is associated. The number of switches 34 is subject to considerable variation, depending upon the complexity of the springs to be produced on the machine, but it will be understood that each set of cams 52 is independently adjustable, relative to the other sets of cams, and adjustment of one set of cams does not affect the adjustment of other sets. The various switches 34 control the feed cylinder 66, cut-off cylinder 67, spindle rack actuating cylinder 68, and the numerous forming tool cylinders 71. Forming and forming tool elevating cylinders 71, 72 may be added and subtracted, depending upon the requirements of the job.

Feed cylinder 66 is horizontally longitudinally disposed on table 12, and its rod 76 is connected to carriage 77 which reciprocates horizontally in ways 75 fixed to table 12. Mounted on the carriage 77 is a small hydraulic gripper cylinder 78 disposed transverse to feed cylinder 66, and carrying a gripper 79 attached to its rod 81. By means of duct 82 the pressure of fluid in cylinder 66 is transmitted to gripping cylinder 78 through hollow piston rod 76, and hence both cylinders 66 and 78 are actuated simultaneously. Opposite gripper carriage 77 is anvil or abutment 83.

Chains 86 are fixed to carriage 77 and pass around sprockets 87 on table 12 and connected to springs 88 on the underside of the table for the purpose of returning carriage 77 at the end of the feed stroke of the feed cylinder 66. However, springs 88 create a resistance to movement of feed carriage 77 with the result that pressure builds up in cylinders 66 and 78 simultaneously. Hence feed carriage 77 will not advance until sufficient pressure is built up in gripping cylinder 78 to grip wire 91, fed from a coil in a coil box (not shown) at the left end of the machine as viewed in FIG. 1. At the end of the feed stroke, the pressure is released which results in deenergizing solenoid 33 controlling feed valve 32, and thus the gripper is released and the feed carriage returned to initial position by spring 88. Tension of spring 88 is adjusted by shaft 93 in brackets 94 and connected to cable 96 connected to the end of spring 88.

A pawl 97 biased by spring 98 is installed at guide 92 which prevents the wire 91 from moving backwards. In the event it is desired to feed into the machine a length of wire which is greater than the length of stroke of feed cylinder 66, then two or more rapid strokes of the feed cylinder 66 may be timed by means of the timing mechanism.

The wire is fed by the feed mechanism through the cut-off mechanism 101 mounted at any desired point on the table 12. Cut-off mechanism 101 comprises a vertical plate 102 or backbone having a horizontally extending cutter quill 103 through the central hole 104 of which passes the wire 91. To one side of the backbone 102 is a horizontally reciprocating knife 106 mounted in carriage 107 sliding in ways 108 fastened to backbone 102 so that it can be forced across the quill opening 104 by pressure from cylinder 67, also mounted on backbone 102. Thus after the wire has been fed by the feed mechanism it is cut off by the cut-off knife 106. Return of carriage 107 is accomplished by springs 109 connected at one end to backbone 102 and at the other end to ears 110 on carriage 107. Associated with cut-off tool 106 may be one or more forming tools 111 which may bend the end of the severed wire. Construction and function of such forming tool 111 forms no part of the present invention, and is not herein illustrated in detail other than showing its cylinder 71 and return spring 112.

Torsion springs generally have a helical coil and an important feature of the present machine is the provision of a vertical spindle 121 which depends from the gear housing 22 and carries on its lower end an arbor 122 and an eccentric pin 123 parallel to the arbor. The wire 91 is fed between the pin 123 and arbor 122 and spindle 121 caused to revolve, thereby winding the helical coil. Above arbor 122 spindle 121 is formed with a spline 124 and is turned by means of gear 126 mounted on stub shaft 127 rotatably mounted in driver plate 128 which comprises the bottom of housing 22. The drive for gear 126 is subject to infinite variations. Actuation of gear 126 is controlled by means of rack 19 mounted on the bottom of table 12. Rack 19 is caused to move in its forward direction by means of cylinder 68. For convenience in adjustment cylinder 68 is located on the top of table 12 and its rod 131 is connected to a horn 132 which extends down through slot 133 in table 12 and is connected to one end of rack 19. Rack 19 meshes with pinion 136 on the underside of table 12, which is on the lower end of vertical shaft 137 which extends up through spacer housing 21 into gear box housing 22. Various gears may be interposed between vertical shaft 137 and gear 126. As shown in the accompanying drawings, there is provided a drive gear 138 on shaft 137 meshing with idler 139 which in turn meshes with gear 141 concentric with and fixed for rotation with gear 126. The spacing of the parts is accomplished by means of the triangular spacing member 142 in which are journalled shafts 127, 137 and the shaft 143 of idler 139. In order to drive the spindle 121 in the opposite direction idler 139 is omitted by inverting the spacing member 142 and substituting for gear 138 a gear of larger diameter to mesh directly with gear 141. In this position of the mechanism, idler 139 is above spacing member 142 and inoperative. The gear ratios may be altered to suit the job conditions.

The return of rack 19 and of spindle 121 is preferably accomplished by means of springs 146 mounted on the underside of table 12. One end of spring 146 is connected to cable 147 and wrapped around adjustment shaft 148 supported by brackets 149 and controlled by ratchet 151 and pawl 152. By adjustment of shaft 148 the tension of springs 146 may likewise be adjusted. The opposite end of spring 146 is connected to chain 153 passing around sprocket 154 and attached to horn 132.

Adjustment of the vertical position of arbor 122 is accomplished by vertical hydraulic cylinder 69, which is a double acting cylinder mounted on legs 156 on the top of gear box 22 housing, and having its rod 157 connected by fitting 158 to spindle 121. Preferably the spindle retraction is a hydraulically operated system which automatically withdraws the spindle 121 in a vertical sense in coordination with rotation of the spindle. A feature of this actuation is the fact that the arbor 122 presents a clean surface regardless of the number of coils being wound, within the limits of the capacity of the machine.

Figure 3:
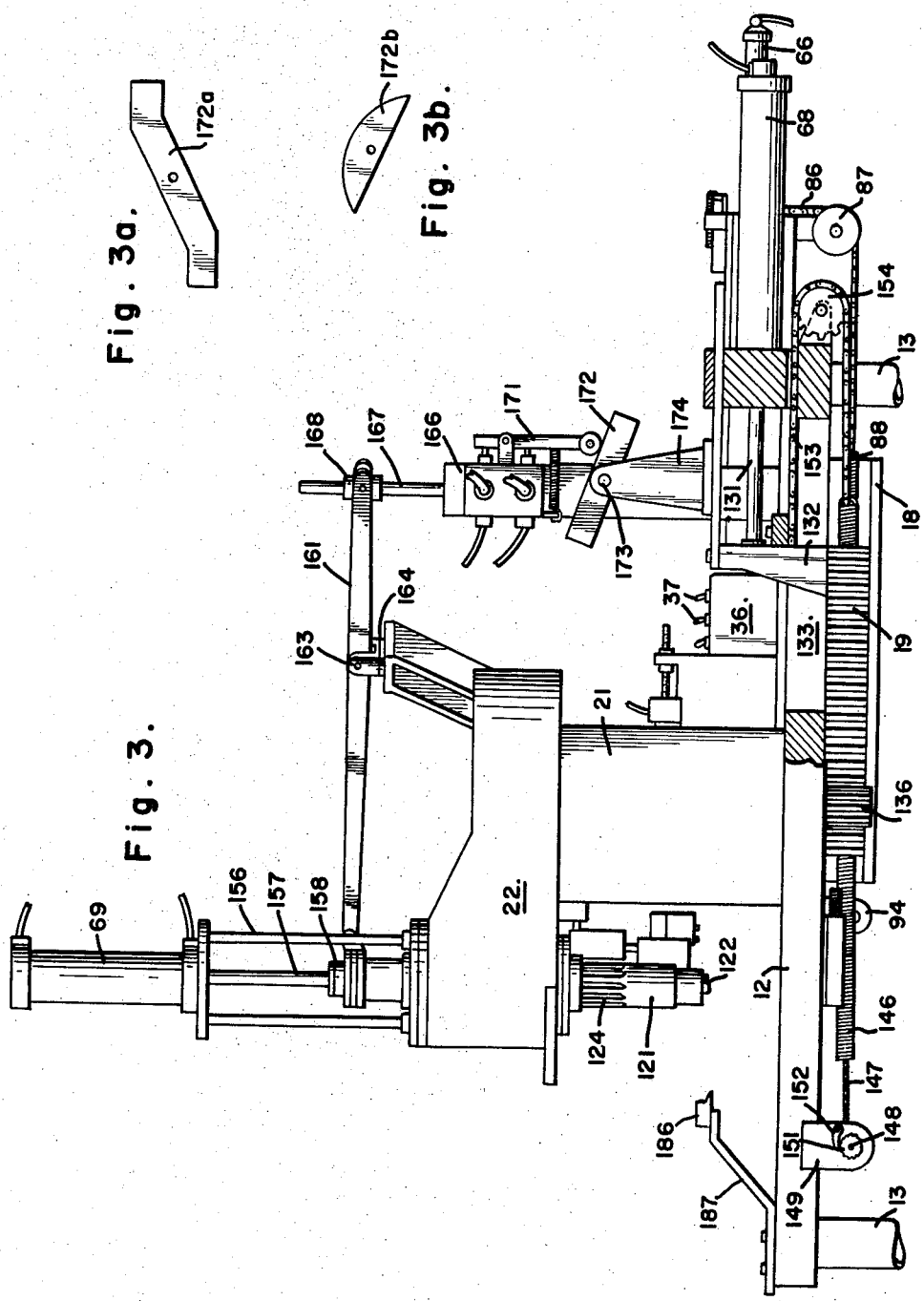
FIG. 3 is a fragmentary side elevation viewed from the opposite direction from FIG. 1.
Figure 4:
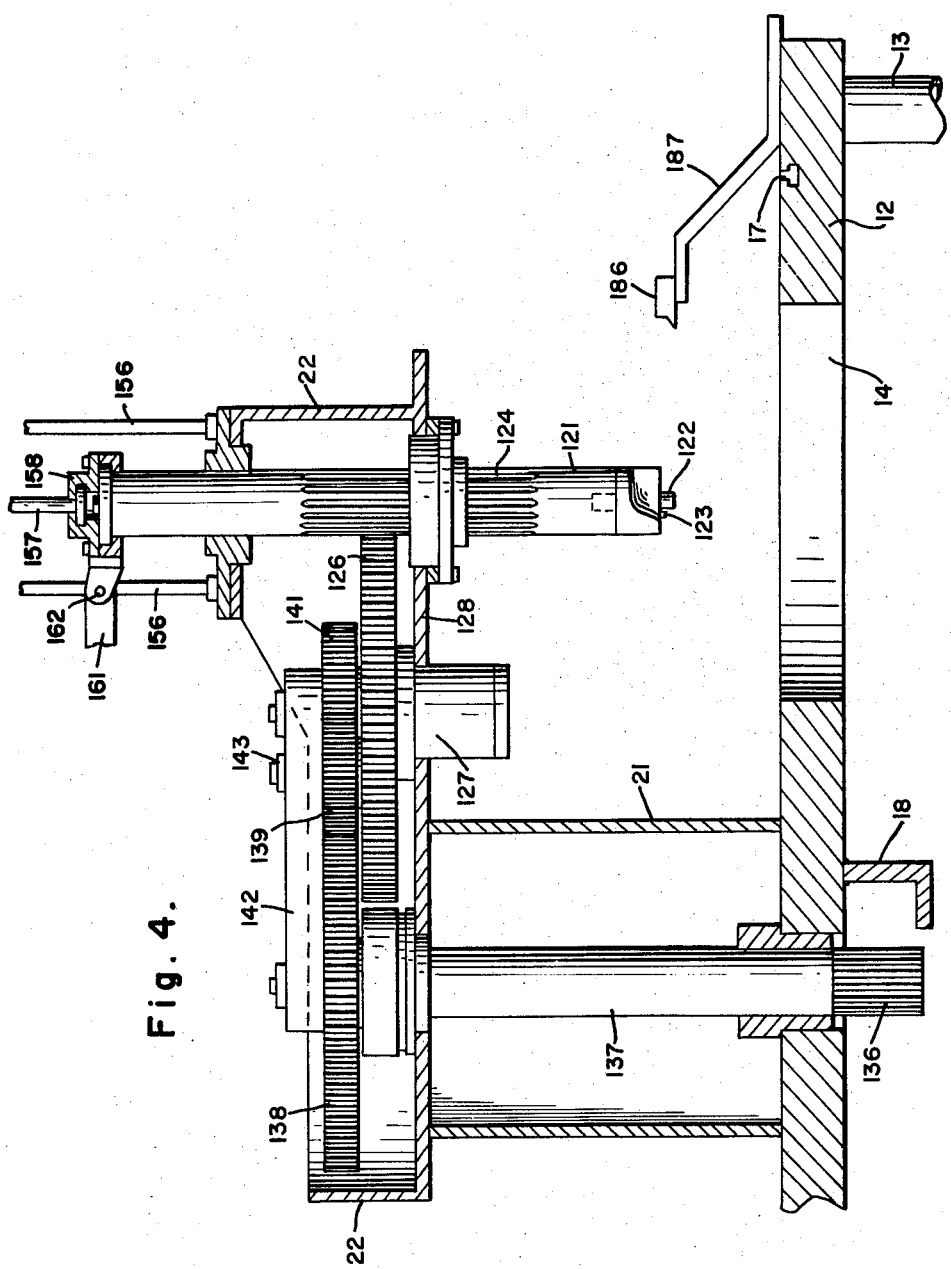
FIG. 4 is a fragmentary vertical sectional view taken substantially along line 4—4 of FIG. 2.
Figure 5:
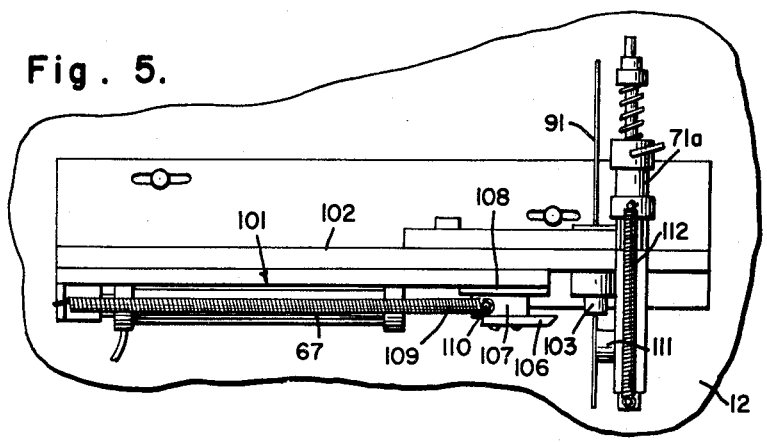
FIG. 5 is a fragmentary plan view of the feed and cut-off mechanisms.
Figure 6:
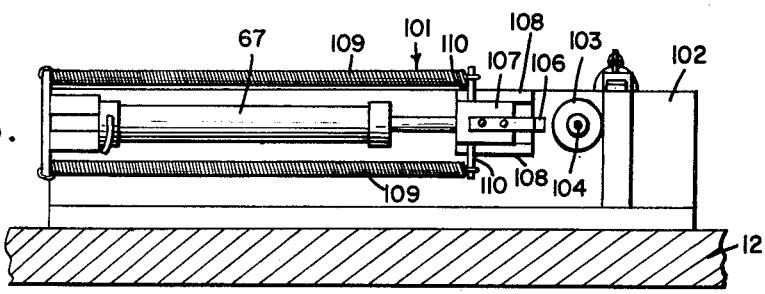
FIG. 6 is an elevation of the structure of FIG. 5.

It will be understood that some springs have a uniform spacing between coils, but that the pitch between coils may be different for different jobs. Other springs have a variable distance between coils. Control of the coil spacing is achieved by coordination of the rotation of the spindle with its vertical movements. Thus a walking beam 161 has one end connected to spindle 121 by pivot 162, its middle fulcrumed by means of pivot 163 to stationary support 164 mounted on housing 22, and its other end carries an extremely sensitive tracer control valve 166, which is on the end of rod 167 connected for vertical adjustment by sleeve 168 on beam 161. One suitable tracer valve 166 is that manufactured by Turchan Follower Machine Co., of Dearborn, Michigan. The valve 166 has a stylus 171 which engages cam 172 mounted by screw 173 in holder 174 which in turn is fixed for movement with horn 132 and rack 19. The shape of cam 172 controls the spacing of the coils of the spring. Thus, assuming that working surface of cam 172 is a straight line (see FIG. 3), a uniform distance between the coils is achieved, the pitch of the cam 172 determining the distance between coils. As the rack 19 advances, cam 172 moves, and stylus 171 in contact with the cam controls the opening and closing of valve 166, so that the cylinder 69 is energized to raise the spindle 121 in direct relationship to the rotation of the spindle. It will be understood, however, that various shapes of cams may be used which vary the pitch of the spring coil or form closed coils, or variable pitch coils. (See cams 172a, 172b in FIGS. 3A and 3B.)

Spaced around the machine are a variety of forming tools 182, 183. The number, position and function of such tools 182, 183 forms no part of the present invention and is well understood in the spring forming art. These tools 182, 183 fabricate various bends and turns in the spring wire, depending upon the specifications of the job. Each forming tool is actuated by a cylinder 71, and its elevation may be controlled by an elevating cylinder 72. Cylinders 71 and 72 are controlled by means of solenoid actuated valves 32, which are in turn controlled by timer 36.

Figure 11:
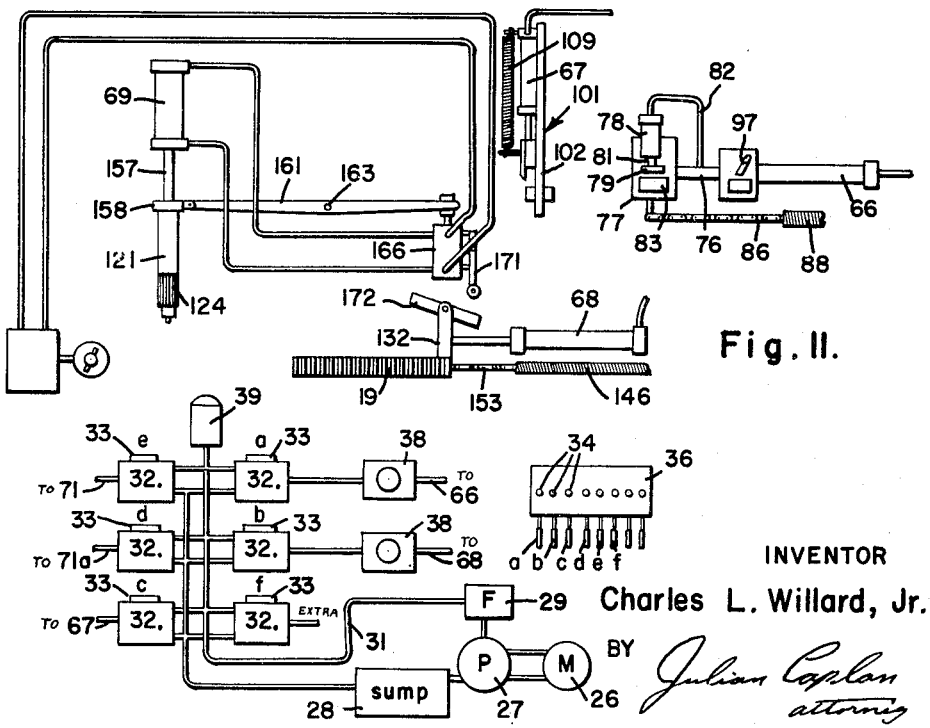
FIG. 11 is a schematic piping diagram of the hydraulic system and portions of the associated structure.

The hydraulic system is shown schematically in FIG. 11. The various valves 32 are connected to various cylinders as indicated in the drawing by suitable legends. Each valve 32 is actuated by its solenoid 33 and each solenoid is controlled by a switch 34 at timer 36.

Operation

At the commencement of the cycle of operation all switches 34 are de-energized and all cylinders likewise de-energized. As motor 41 revolves the cycle proceeds, the duration of cycle (i.e., number of springs per minute) is controlled by speed adjustment 42.

The first step in the cycle is the feed of wire 91 from the coil box (not shown), which is performed by gripper 79 clamping the wire against anvil 83 and carriage 77 moving toward the spindle 121. Wire 91 is fed between arbor 122 and pin 123 unitl it hits against stop 186 on the end of arm 187 fastened to table 12 opposite spindle 121. The length of wire beyond the spindle is determined by the position of stop 186.

After the feed of the wire is completed, spindle 121 is caused to revolve by movement of rack 19 under the force of cylinder 68, and this forms a coil in the wire around arbor 122. During coiling, spindle 121 moves upward, the movement being governed by cam 172, valve 166, and cylinder 69, thus determining the shape of the coil. When the turning of spindle 121 is completed, the spring is pushed off arbor 122 by further upward movement of the spindle, the finished part dropping through hole 14 into box 16. The direction of coiling is determined by the presence or absence of idler 139. Various gear ratios may be used in the gears in housing 22, depending upon the kind of wire being used and the job requirements.

As coiling is being carried out, cut-off tool 106 severs the wire at the desired length to the left of spindle 121 (as viewed in FIG. 1), depending upon the location of cut-off mechanism 101 on table 12. One or more forming tools may move with carriage 107 to form the wire. Return of carriage 107 is accomplished by springs 109.

A multiplicity of forming operations may be performed on either the part of the wire to the left of spindle 121 or the part to the right, as by tools 111 and by tools 182, 183. The right-hand operations are preferably performed after the coil is formed; the left-hand operations while the coil is being wound. All three forming operations are standard in spring manufacture, although conventionally they may be performed as secondary operations.

Thus a very complex shape of spring may be made in a single cycle of operation.

Although the foregoing invention has been described in some detail, by way of illustration and example for purposes of clarity of understanding, it is understood that certain changes and modifications may be practiced within the spirit of the invention and scope of the appended claims.

What is claimed is:

1. In a spring manufacturing machine, a frame having a horizontal table, a source of hydraulic pressure, a plurality of valves connected into said source, timing means individually controlling said valves, feed means on said frame for feeding wire into said machine in a direction parallel to said table, first hydraulic means for actuating said feed means controlled by a first of said valves, cut-off means for cutting off wire at desired lengths, second hydraulic means for actuating said cutoff means controlled by a second valve of said valves, a spindle mounted for rotation about an axis perpendicular to said table and for movement along said axis and rotatable to form a coil in said wire, a rack reciprocable on said table, gear means for transmitting motion from said rack to rotary motion of said spindle, third hydraulic means for actuating said rack controlled by a third valve of said valves, fourth hydraulic means for moving said spindle in the direction of its axis of rotation, a fourth valve for controlling said fourth hydraulic means in timed relation to rotation of said spindle, at least one tool mounted on said frame for performing a bending operation on said wire, fifth hydraulic means for actuating said tool controlled by a fifth valve of said valves, and timing means for timing, opening and closing of each said valve, said timing means being adjustable to open and close each said valve independently of every other said valve.

2. A machine according to claim 1 which further comprises sixth hydraulic means for altering the elevation of said tool controlled by a sixth valve of said valves.

3. In a spring manufacturing machine, a frame having a horizontal table, a source of hydraulic pressure, a plurality of valves connected into said source, timing means individually controlling said valves, feed means on said frame for feeding wire into said machine in a direction parallel to said table, first hydraulic means for actuating said feed means controlled by a first of said valves, cutoff means for cutting off wire at desired lengths, second hydraulic means for actuating said cutoff means controlled by a second valve of said valves, a spindle mounted for rotation about an axis perpendicular to said table and for movement along said axis and rotatable to form a coil in said wire, a rack reciprocable on said table, gear means for transmitting motion from said rack to rotary motion of said spindle, third hydraulic means for actuating said rack controlled by a third valve of said valves, fourth hydraulic means for moving said spindle in the direction of its axis of rotation, a fourth valve for controlling said fourth hydraulic means in timed relation to rotation of said spindle, and timing means for timing opening and closing of each said valve, said timing means being adjustable to open and close each said valve independently of every other said valve, said feed means comprising ways on said table, a carriage slidable in said ways and moved toward said spindle by said first hydraulic means, a carriage return spring on said table connected to said carriage to return said carriage to initial position upon release of said first hydraulic means, a gripper movable on said carriage transverse to the direction of movement of said carriage, a stationary abutment on said carriage opposite said gripper, a gripper cylinder moving said gripper toward said abutment, and a hydraulic line interconnecting said gripper cylinder and said first hydraulic means, whereby opening of said first valve energizes said gripper cylinder to move said gripper to grip wire against said abutment for movement with said carriage and then moves said carriage along said ways to feed said wire into said machine.

4. In a spring manufacturing machine, a frame having a horizontal table, a source of hydraulic pressure, a plurality of valves connected into said source, timing means individually controlling said valves, feed means on said frame for feeding wire into said machine in a direction parallel to said table, first hydraulic means for actuating said feed means controlled by a first of said valves, cutoff means for cutting off wire at desired lengths, second hydraulic means for actuating said cutoff means controlled by a second valve of said valves, a spindle mounted for rotation about an axis perpendicular to said table and for movement along said axis and rotatable to form a coil in said wire, a rack reciprocable on said table, gear means for transmitting motion from said rack to rotary motion of said spindle, third hydraulic means for actuating said rack controlled by a third valve of said valves, fourth hydraulic means for moving said spindle in the direction of its axis of rotation, a fourth valve for controlling said fourth hydraulic means in timed relation to rotation of said spindle, and timing means for timing opening and closing of each said valve, said timing means being adjustable to open and close each said valve independently of every other said valve, said fourth valve being a tracer valve, said tracer valve having a stylus, and which further comprises a beam, means pivotally mounting said beam, one end of said beam being fixed for vertical movement with said spindle, said tracer valve being mounted on the end of said beam opposite said spindle, a cam, and means mounting said cam for movement with said rack, said stylus engaging said cam to control vertical movement of said spindle in timed relation to rotary movement of said spindle.

5. A machine according to claim 4 in which said cam is interchangeable for different shapes.

6. In a spring manufacturing machine, a frame, feed means for feeding wire mounted on said frame, cut-off means for severing wire on said frame, a coil winding spindle rotatably mounted on said frame, spindle turning means for rotating said spindle, at least one tool mounted on said frame for performing a bending operation on said wire, a timer shaft, means for turning said timer shaft, a plurality of cams on said timer shaft, a switch for each said cam mounted to be opened and closed upon rotation of said timer shaft, and individual actuating means for said feed means, said cutoff means, said spindle rotating means and said tool, each controlled by one of said switches, said timer shaft being formed with a plurality of stationary collars corresponding in number to said cams, a corresponding plurality of axially movable collars, and means for detachably securing each said movable collar to said timer shaft, and in which each said cam comprises a pair of discs rotatable on said shaft interposed between one said stationary collar and one said movable collar, each said disc having a high dwell and a low dwell, whereby angular adjustment of said discs controls the commencement and duration of closing of said switch with which said cam is associated.

7. A machine according to claim 6 in which said shaft is formed with at least one chordal groove and said discs are formed with segmental gaps in horseshoe shape whereby each said disc may be removed from said shaft through said groove when said movable collar for said cam is moved away from its corresponding stationary collar.

8. In a spring manufacturing machine, a frame, a source of hydraulic pressure, a timer shaft, means for driving said timer shaft, a plurality of timer cams on said timer shaft, a plurality of switches, one said switch for each said timer cam, a plurality of valves, one said valve controlled by each said switch and connected to said source of hydraulic pressure, feed means on said frame for feeding wire into said machine, first hydraulic means for actuating said feed means controlled by a first valve of said plurality of valves, cutoff means for cutting off wire at desired lengths, second hydraulic means for actuating said cutoff means controlled by a second valve of said plurality of valves, a spindle mounted for rotation about an axis perpendicular to the direction of movement of said feed means and for movement along said axis and rotatable to form a coil in said wire, a rack reciprocable on said frame, gear means for transmitting motion from said rack to rotary motion of said spindle, third hydraulic means for actuating said rack controlled by a third valve of said plurality of valves, fourth hydraulic means for moving said spindle in the direction of its axis of rotation, and a fourth valve for controlling said fourth hydraulic means in timed relation to rotation of said spindle, each said timer cam being adjustable relative to the other said timer cams to individually control said feed means, cutoff means, spindle rotation and spindle axial movement, said feed means comprising ways on said frame, a carriage slidable in said ways and movable toward said spindle by said first hydraulic means, a gripper movable on said carriage transverse to the direction of movement of said carriage, a stationary abutment on said carriage opposite said gripper, a gripper cylinder moving said gripper toward said abutment, and a hydraulic line interconnecting said gripper cylinder and said first hydraulic means whereby opening of said first valve energizes said gripper cylinder to move said gripper to grip wire against said abutment for movement with said carriage and then moves said carriage along said ways to feed wire into said machine.

9. In a spring manufacturing machine, a frame, a source of hydraulic pressure, a timer shaft, means for driving said timer shaft, a plurality of timer cams on said timer shaft, a plurality of switches, one said switch for each said timer cam, a plurality of valves, one said valve controlled by each said switch and connected to said source of hydraulic pressure, feed means on said frame for feeding wire into said machine, first hydraulic means for actuating said feed means controlled by a first valve of said plurality of valves, cutoff means for cutting off wire at desired lengths, second hydraulic means for actuating said cutoff means controlled by a second valve of said plurality of valves, a spindle mounted for rotation about an axis perpendicular to the direction of movement of said feed means and for movement along said axis and rotatable to form a coil in said wire, a rack reciprocable on said frame, gear means for transmitting motion from said rack to rotary motion of said spindle, third hydraulic means for actuating said rack controlled by a third valve of said plurality of valves, fourth hydraulic means for moving said spindle in the direction of its axis of rotation, and a fourth valve for controlling said fourth hydraulic means in timed relation to rotation of said spindle, each said timer cam being adjustable relative to the other said timer cams to individually control said feed means, cutoff means, spindle rotation and spindle axial movement, said fourth valve being a tracer valve and said tracer valve has a stylus, and which further comprises a beam, means pivotally mounting said beam, one end of said beam being fixed for vertical movement with said spindle, said tracer valve being mounted on the end of said beam opposite said spindle, a cam, and means mounting said cam for movement with said rack, said stylus engaging said cam to control vertical movement of said spindle in timed relation to rotary movement of said spindle.

References Cited in the file of this patent
UNITED STATES PATENTS

| | | |
|---|---|---|
| 2,122,468 | Hill | July 5, 1938 |
| 2,124,167 | Montgomery | July 19, 1938 |
| 2,308,963 | Davis et al. | Jan. 19, 1943 |
| 2,653,630 | Platt | Sept. 29, 1953 |
| 2,765,468 | Cootes et al. | Oct. 9, 1956 |
| 2,831,570 | Conrad | Apr. 22, 1958 |
| 2,843,159 | Bonde et al. | July 15, 1958 |
| 2,998,046 | Kovner | Aug. 29, 1961 |
| 3,049,155 | Livermore | Aug. 14, 1962 |